United States Patent
Cheng (10) Patent No.: US 6,464,244 B1
(45) Date of Patent: Oct. 15, 2002

(54) STROLLER ASSEMBLY HAVING A FOLDABLE FRAME

(75) Inventor: Larry Cheng, Mountain View, CA (US)

(73) Assignee: Evenflo Company, Inc., Vandalia, OH (US)

( * ) Notice: Subject to any disclaimer, the term of this patent is extended or adjusted under 35 U.S.C. 154(b) by 0 days.

(21) Appl. No.: 09/854,785

(22) Filed: May 14, 2001

(51) Int. Cl.⁷ .................................................. B62B 7/06
(52) U.S. Cl. ........................................ 280/650; 280/642
(58) Field of Search ................................ 280/650, 647, 280/642, 47.4, 47.38, 639; 297/377

(56) References Cited

U.S. PATENT DOCUMENTS

| | | | |
|---|---|---|---|
| 2,689,135 A | * 9/1954 | Toohey | 280/41 |
| 4,030,769 A | 6/1977 | Peng et al. | 280/42 |
| 4,062,555 A | 12/1977 | Peng et al. | 280/42 |
| 4,173,355 A | 11/1979 | Perego | 280/642 |
| 4,660,850 A | * 4/1987 | Nakao et al. | 280/642 |
| 4,681,340 A | 7/1987 | Pasquini | 280/642 |
| 4,697,823 A | * 10/1987 | Kassai | 280/644 |
| 4,872,692 A | * 10/1989 | Steenburg | 280/30 |
| 4,930,697 A | * 6/1990 | Takahashi et al. | 224/275 |
| 5,087,066 A | 2/1992 | Mong-Hsing | 280/644 |
| 5,188,380 A | 2/1993 | Tucek | 280/30 |
| 5,417,449 A | 5/1995 | Shamie | 280/642 |
| 5,454,584 A | 10/1995 | Haut et al. | 280/642 |
| 5,472,224 A | 12/1995 | Cabagnero | 280/642 |
| 5,605,409 A | 2/1997 | Haut et al. | 403/102 |
| 5,669,625 A | 9/1997 | Cabagnero | 280/647 |
| 5,772,235 A | * 6/1998 | Espenshade | 280/643 |
| 5,988,669 A | 11/1999 | Freese et al. | 280/642 |
| 5,988,670 A | 11/1999 | Song et al. | 280/648 |
| 6,139,046 A | 10/2000 | Aalund et al. | 280/642 |
| 6,270,111 B1 | * 8/2001 | Hanson et al. | 280/650 |

* cited by examiner

Primary Examiner—Brian L. Johnson
Assistant Examiner—Tony Winner
(74) Attorney, Agent, or Firm—Thompson Hine LLP (57) ABSTRACT

A stroller assembly includes a stroller seat and a foldable stroller frame. The stroller seat has a seat-bottom member. The stroller frame has a first side member, a first front leg, a first handle arm, and a first lower arm. The seat-bottom member is attached to the first side member. The front leg is pivotally attached to the first side member. The first lower arm is pivotally attached to the front leg and to the first handle arm. The first handle arm is pivotally attached to the first side member.

20 Claims, 5 Drawing Sheets

STROLLER ASSEMBLY HAVING A FOLDABLE FRAME

BACKGROUND OF THE INVENTION

The present invention relates generally to a stroller, and more particularly to a stroller assembly having a foldable frame.

Strollers provide wheeled transport for babies, infants, and young children. Strollers typically have foldable frames. A foldable frame has un unfolded (use) position and a folded (storage) position. In some frames, known as N frames, the front and rear legs are not pivoted together. Typically, in an N frame, the frame has a shape of generally a parallelogram having a top bar (which is the stroller armrest), a front bar (which is the stroller front leg tube), a rear bar (which is the lower portion of the stroller upper-handle tube), and a bottom bar (which is the stroller seat-bottom tube). The top, front, rear, and bottom bars are pivotally attached together to form the foldable parallelogram. A latch locks the frame in the unfolded position. Unlocking the latch allows the frame to be collapsed to the folded position. In some known designs, the frame includes a hinge link pivotally attaching the lower portion of the stroller upper-handle tube to the outside side of the rear leg tube, wherein the top of the rear leg tube is pivotally attached to the armrest.

A conventional stroller may have other components not considered part of the frame such as a basket tube. The basket tube is attached to the front of the seat-bottom tube, extends rearward, and supports a basket. The basket is accessible only from the rear of the stroller.

What is needed is a more convenient foldable stroller frame.

SUMMARY OF THE INVENTION

A first expression of the first embodiment of the invention is for a stroller assembly having a stroller seat and a foldable stroller frame. The stroller seat has a seat-bottom member. The frame has an unfolded position and a folded position. The frame, in the unfolded position, includes a first side member, a first front leg, a first rear leg, a first handle arm, a first lower arm, and a first hinge link. The first side member has a front portion and a rear portion. The seat-bottom member is immovably attached to the first side member. The first front leg has a top portion pivotally attached to the front portion of the first side member and has a bottom portion. The first rear leg has a top portion pivotally attached to the first side member intermediate the front and rear portions of the first side member and has a bottom portion. The first handle arm has a top portion and a bottom portion and is pivotally attached to the rear portion of the first side member intermediate the top and bottom portions of the first handle arm. The first lower arm has a front portion and a rear portion and is located below the seat-bottom member. The front portion of the first lower arm is pivotally attached to the first front leg intermediate the top and bottom portions of the first front leg. The bottom portion of the first handle arm is pivotally attached to the first lower arm intermediate the front and rear portions of the first lower arm. The first hinge link has a first end portion and a second end portion. The first end portion of the first hinge link is pivotally attached to the first handle arm intermediate the bottom portion of the first handle arm and the pivotal attachment of the first handle arm to the rear portion of the first side member. The second end portion of the first hinge link is pivotally attached to the first rear leg intermediate the top and bottom portions of the first rear leg.

In one example of the first expression, the first lower arm is a stroller basket support arm spaced apart below the front portion of the seat-bottom member allowing manual access therebetween. In one construction of the first expression, the first lower arm is disposed transversely inward of the first rear leg, and the first hinge link is disposed transversely between the first rear leg and the first lower arm. In one design of the first expression, the first side member has a top portion, and an area of the top portion of the first side member defines a stroller armrest.

A second expression of the first embodiment of the invention is for a stroller assembly having a stroller seat and a foldable stroller frame. The stroller seat has a seat-bottom member. The frame has an unfolded position and a folded position. The frame, in the unfolded position, includes a first side member, a first front leg, a first handle arm, and a first lower arm. The seat-bottom member is attached to the first side member. The first front leg is pivotally attached to the first side member. The first handle arm is pivotally attached to the rear portion of the first side member. The first lower arm is located below the seat-bottom member. The first lower arm is pivotally attached to the first front leg. The first handle arm is pivotally attached to the first lower arm.

In one example of the second expression, the first lower arm is a stroller basket support arm spaced apart below a front portion of the first side member allowing manual access therebetween. In one construction of the second expression, the first lower arm is disposed transversely inward of the first front leg. In one design of the second expression, the first side member has a top) portion, and an area of the top portion of the first side member defines a stroller armrest.

Several benefits and advantages are derived from the invention. In the examples where the first lower arm is a stroller basket support arm, the stroller assemblies of the first and second expressions allow front access to the stroller basket. In the first expression and construction where the first lower arm is disposed transversely inward of the first rear leg and the first hinge link is disposed transversely between the first rear leg and the first lower arm, the first hinge link is not visible from the side of the unfolded stroller frame avoiding catching on the clothing or body of the stroller occupant and the stroller user.

DETAILED DESCRIPTION

A first embodiment of the stroller assembly 10 of the invention is shown in FIGS. 1–5. In a first expression of the first embodiment of the stroller assembly 10 shown in the figures, the stroller assembly 10 includes a stroller seat 72 and a foldable stroller frame 12. The stroller seat has a seat-bottom member 74. The stroller frame 12 has an unfolded frame position (shown in FIG. 3) and a folded frame position (shown in FIG. 5). The stroller frame 12, in the unfolded position, includes a first side member 14, a first front leg 16, a first rear leg 18, a first handle arm 20, a first lower arm 22, and a first hinge link 24. The first side member 14 has a front portion 26 and a rear portion 28. The terms "front" and "rear" are taken with respect to an unfolded stroller frame disposed upright on a horizontal surface. A "front" portion is closer to the front than to the back, and a "back" portion is closer to the back than to the front. The seat-bottom member 74 is immovably attached to the first side member 14. The first front leg 16 has a top portion 30 pivotally attached (at pivot point 32) to the front portion 26 of the first side member 14 and has a bottom portion 34. The terms "top" and "bottom" are taken with respect to an unfolded stroller frame disposed upright on a horizontal surface. A "top" portion is closer to the top than to the bottom, and a "bottom" portion is closer to the bottom than to the top. The first rear leg 18 has a top portion 36 pivotally attached (at pivot point 38) to the first side member 14 intermediate the front and rear portions 26 and 28 of the first side member 14 and has a bottom portion 40. The first handle arm 20 has a top portion 42 and a bottom portion 44 and is pivotally attached (at pivot point 46) to the rear portion 28 of the first side member 14 intermediate the top and bottom portions 42 and 44 of the first handle arm 20. The first lower arm 22 has a front portion 48 and a rear portion 50 and is disposed below the seat-bottom member 74. The front portion 48 of the first lower arm 22 is pivotally attached (at pivot point 52) to the first front leg 16 intermediate the top and bottom portions 30 and 34 of the first front leg 16. The bottom portion 44 of the first handle arm 20 is pivotally attached (at pivot point 54) to the first lower arm 22 intermediate the front and rear portions 48 and 50 of the first lower arm 22. The first hinge link 24 has a first end portion 56 and a second end portion 58. A "first end portion" is closer to the first end than to the second end, and a "second end portion" is closer to the second end than to the first end. The first end portion 56 of the first hinge link 24 is pivotally attached (at pivot point 60) to the first handle arm 20 intermediate the bottom portion of the first handle arm 20 and the pivotal attachment 46 of the first handle arm 20 to the rear portion 28 of the first side member 14. The second end portion 58 of the first hinge link 24 is pivotally attached (at pivot point 62) to the first rear leg 18 intermediate the top and bottom portions 36 and 40 of the first rear leg 18.

In one design of the first expression, the first side member 14 has a top portion 64, and an area 66 of the top portion 64 of the first side member 14 defines a stroller armrest. In the same or another design of the first expression, the seat-bottom member 74 is not pivotally attached to the first front leg 16, to the first handle arm 20, or to the first rear leg 18. In the same or another design of the first expression, the top portion 30 of the first front leg 16 is disposed within the first side member 14 (as indicated by the dashed lines in FIG. 3), and the first side member 14 has an opening 68 allowing pivotal motion of the first front leg 16 between an unfolded front-leg position (shown in FIG. 3) and a folded front-leg position (shown in FIG. 5). In the same or another design of the first expression, the top portion 36 of the first rear leg 18 is disposed within the first side member 14, and the first side member 14 has an opening 68 allowing pivotal motion of the first rear leg 18 between an unfolded rear-leg position (shown in FIG. 3) and a folded rear-leg position (shown in FIG. 5). In the same or another design of the first expression, the first side member 14 is substantially vertically disposed.

In one modification, not shown, the top portion of the first front leg is disposed outside (on either side) of the first side member. In the same or another modification, not shown, the top portion of the first rear leg is disposed outside (on either side) of the first side member.

In one example of the first expression, the first lower arm 22 is a stroller basket support arm. In one modification, the seat-bottom member 74 has a front portion 76, and the front portion 48 of the first lower arm 22 is spaced apart below the front portion 76 of the seat-bottom member 74 allowing manual access therebetween. This allows front access to a stroller basket. In the same or another modification, the stroller assembly 10 also includes a stroller footrest 70 attached to the front portion 48 of the first lower arm 22.

In one construction of the first expression, the first lower arm 22 is disposed transversely inward of the first rear leg 18, and the first hinge link 24 is disposed transversely between the first rear leg 18 and the first lower arm 22. This allows the first hinge link 24 not to be exposed when the stroller frame is in the unfolded frame position which avoids the first hinge link 24 from catching on the clothing or body of the stroller occupant and the stroller user. In the same or another construction, the bottom portion 44 of the first handle arm 20 is transversely disposed between the first rear leg 18 and the first lower arm 22. In other constructions, not shown, the first lower arm, the first rear leg, and the first hinge link are otherwise transversely disposed, and the bottom portion of the first handle arm, the first rear leg, and the first lower arm are otherwise transversely disposed.

In one model of the first expression, the stroller assembly 10 also includes a second side member 78, a second front leg 80, a second rear leg 82, a second handle arm 84, a second lower arm 86, and a second hinge link 88. In one construction, the first and second handle arms 20 and 84 are arms of a stroller push handle, and the first and second lower arms 22 and 86 are arms of a stroller basket support. In one construction, the arms are tubular arms, and the legs are tubular legs. The second member, legs, arms, and hinge link are substantially identical mirror images of the first member, legs, arms, and hinge link. In the same or another model, the seat-bottom member 74 is a tubular member having portions attached to the first and second side members 14 and 78. In the same or another model, the stroller assembly 10 includes front wheels 90 attached to the first and second front legs 16 and 80, rear wheels 92 attached to the first and second rear legs 18 and 82, a stroller bumper bar 94 (with an attached child tray 96) attached to the first and second side members 14 and 78, a console tray 98 attached to the first and second handle arms 20 and 84, a seat-back tube (not shown), and fabric (not shown) attached to the seat-bottom member (e.g., to help create a sling seat bottom), to the seat-back tube (e.g., to help create a sling seat back), and to the first and second lower arms (to help create a stroller basket).

Figure 1:
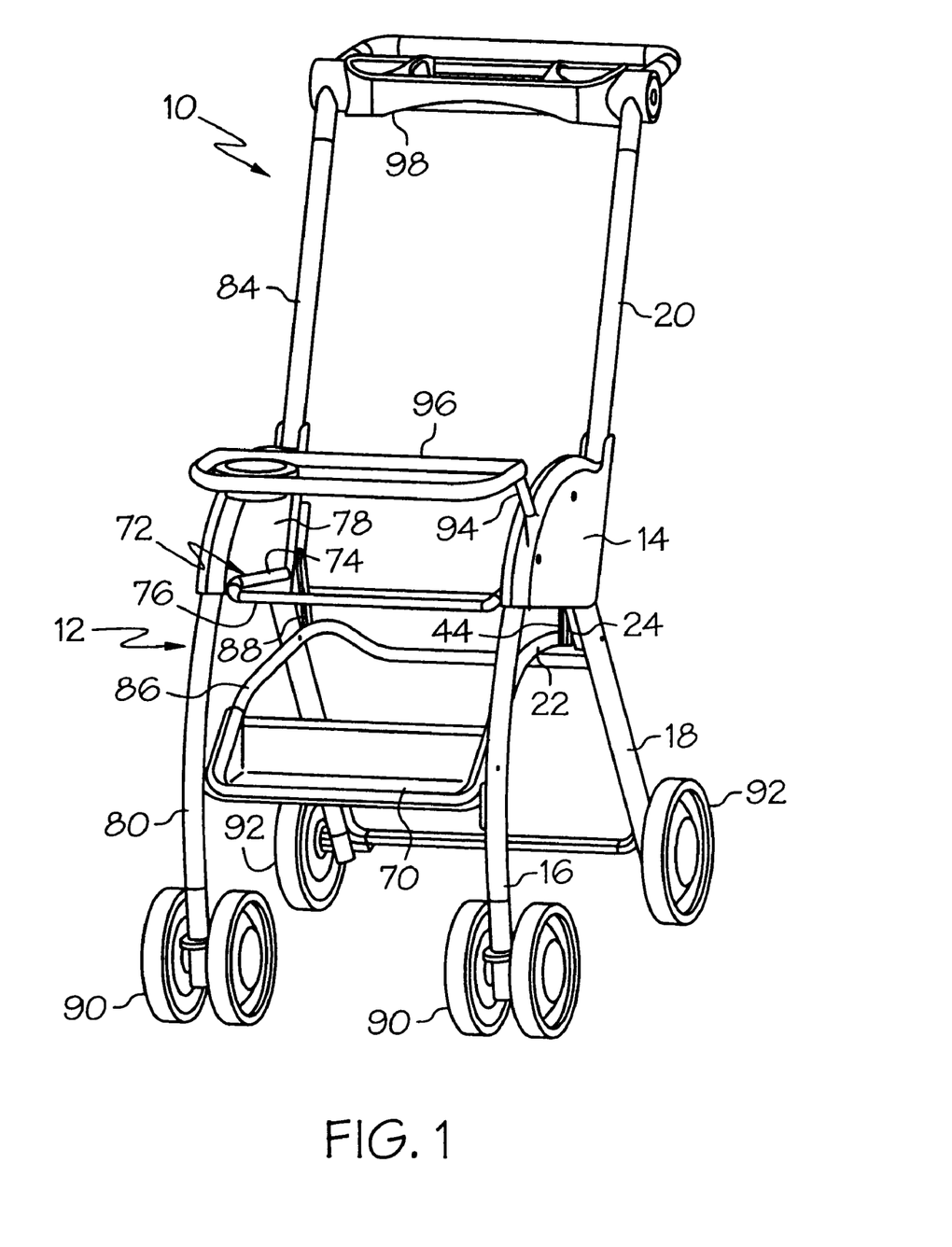
FIG. 1 is a perspective view of a first embodiment of the stroller assembly of the inventing including a stroller frame and showing the front and first side of the stroller assembly.
Figure 2:
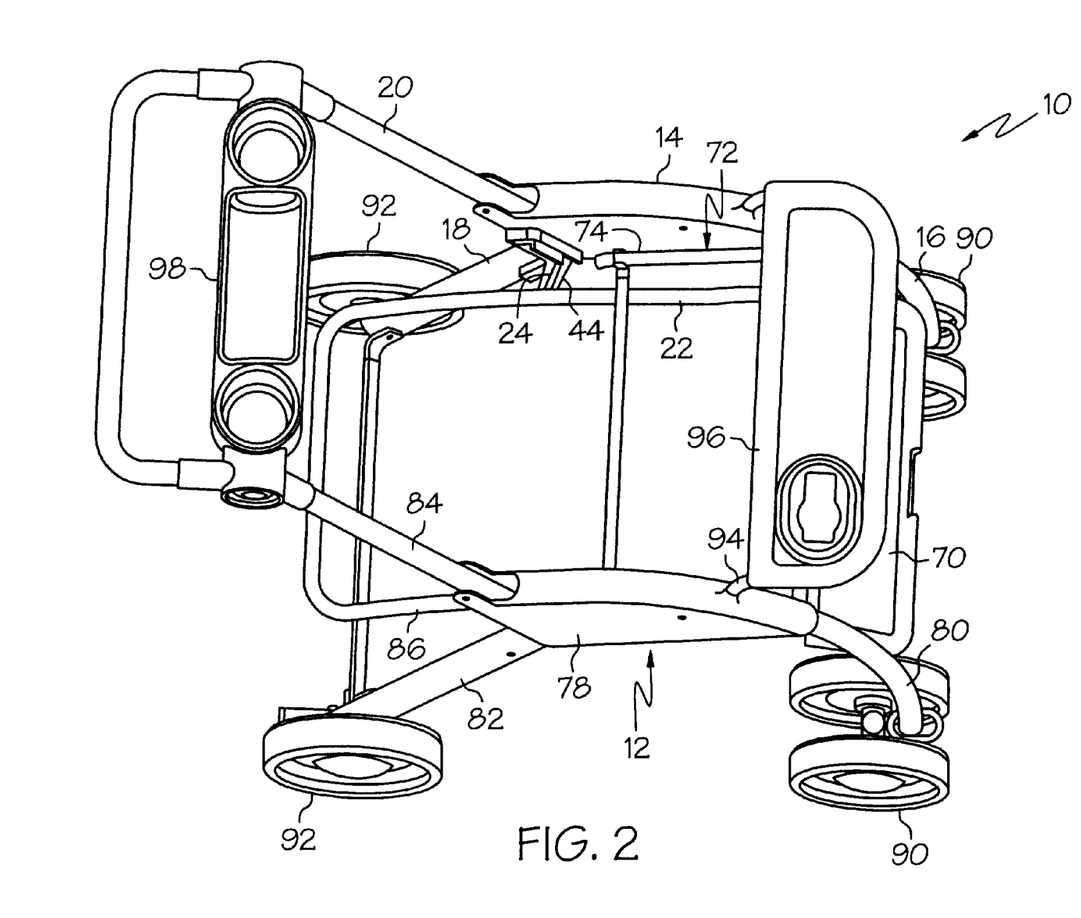
FIG. 2 is a perspective view of the stroller assembly of FIG. 1 showing the top and the second side of the stroller assembly.
Figure 3:
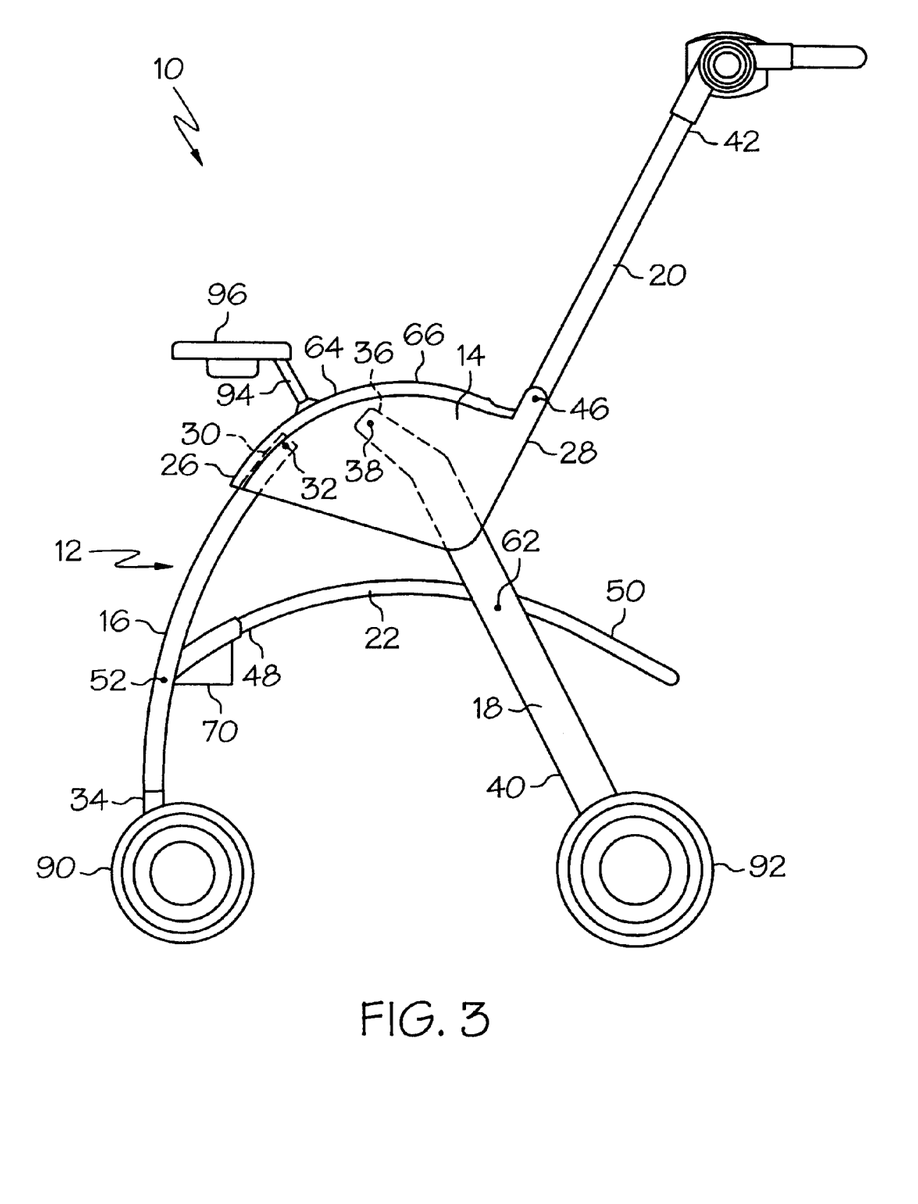
FIG. 3 is a side-elevational view of the stroller assembly of FIG. 1 showing the first side of the stroller assembly in the unfolded frame position.
Figure 4:
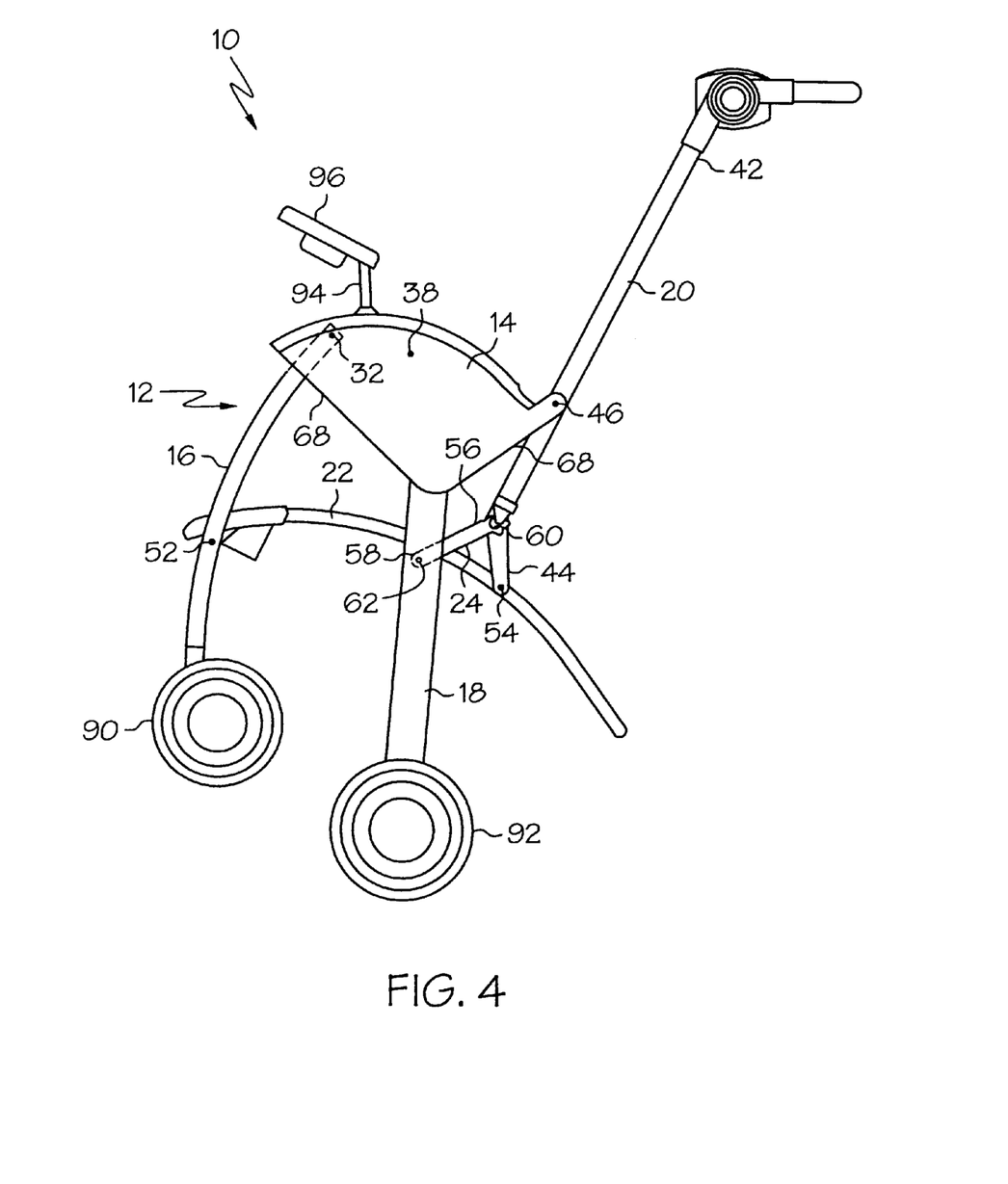
FIG. 4 is view, as in FIG. 3, showing the stroller assembly in a partially-folded frame position.
Figure 5:
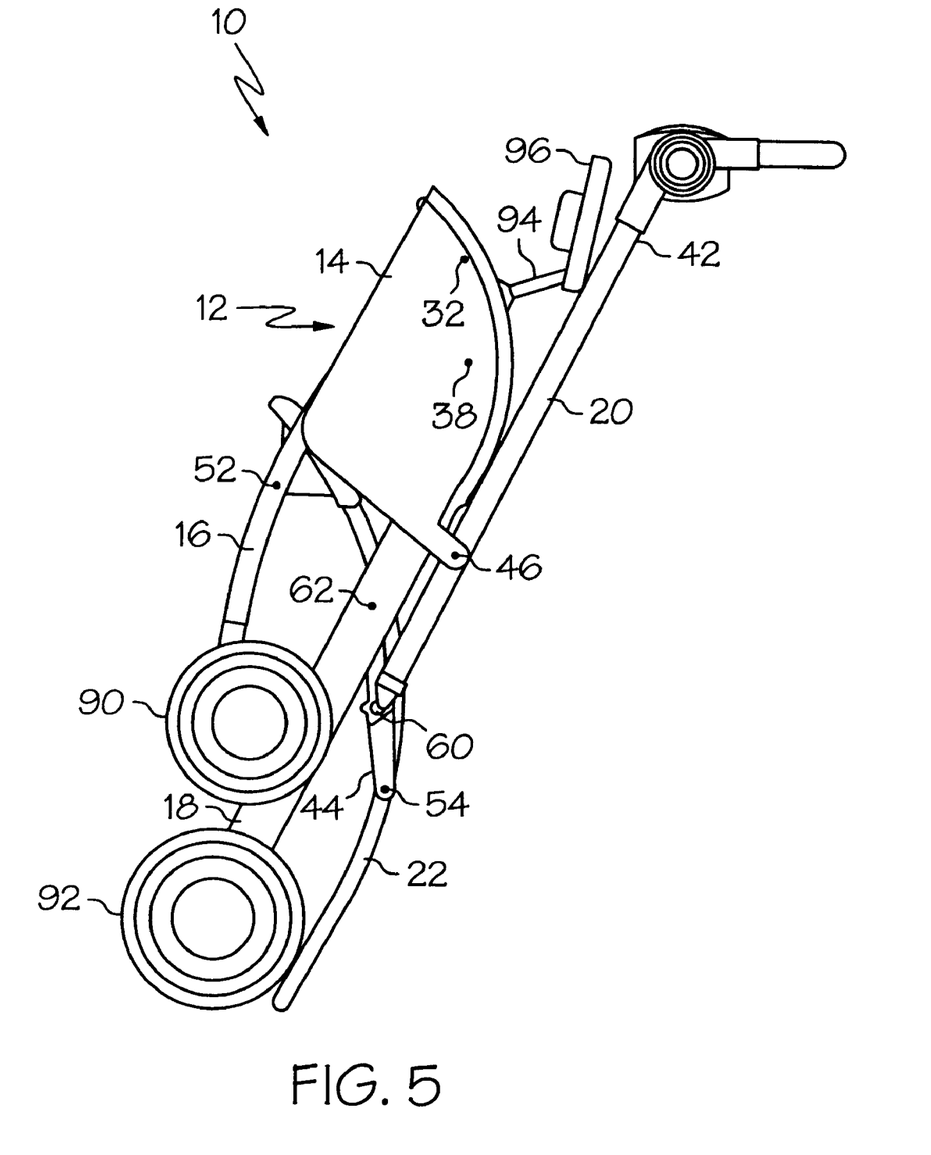
FIG. 5 is a view, as in FIG. 3, showing the stroller assembly in the folded frame position.

The stroller assembly 10 is provided with means for locking the stroller frame 12 in the unfolded frame position and for unlocking the stroller frame 12 from the unfolded frame position (shown in FIG. 3) allowing the stroller frame 12 to be collapsed to the folded frame position (shown in FIG. 5). The stroller-frame locking and unlocking means does not form any part of the invention, and has been omitted from the figures for clarity. Existing stroller-frame locking and unlocking means (such as latches) are known to the artisan, and new ones may be conceived by inventors. When unlocked, the first front and rear legs 16 and 18 are pivoted to the rear, and the first handle arm 20 is pivoted to the front as shown in FIGS. 4 and 5.

In a second expression of the first embodiment of the stroller assembly 10 shown in the figures, the stroller assembly 10 includes a stroller seat 72 and a foldable stroller frame 12. The stroller seat has a seat-bottom member 74. The stroller frame 12 has an unfolded frame position (shown in FIG. 3) and a folded frame position (shown in FIG. 5). The stroller frame 12, in the unfolded position, includes a first side member 14, a first front leg 16, a first handle arm 20, and a first lower arm 22. The seat-bottom member 74 is (movably or immovably) attached to the first side member 14. The first front leg 16 is pivotally attached to the first side member 14. The first handle arm 20 is pivotally attached to the first side member 14. The first lower arm 22 is disposed below the seat-bottom member 74. The first lower arm 22 is pivotally attached to the first front leg 16. The first handle arm 20 is pivotally attached to the first lower arm 22.

In one design of the second expression, the first side member 14 has a top portion 64, and an area 66 of the top portion 64 of the first side member 14 defines a stroller armrest. In the same or another design of the second expression, the seat-bottom member 74 is not pivotally attached to the first front leg 16 or to the first handle arm 20. In the same or another design of the second expression, a top portion 30 of the first front leg 16 is disposed within the first side member 14 (as indicated by the dashed lines in FIG. 3), and the first side member 14 has an opening 68 allowing pivotal motion of the first front leg 16 between an unfolded front-leg position (shown in FIG. 3) and a folded front-leg position (shown in FIG. 5). In the same or another design of the second expression, the first side member 14 is substantially vertically disposed. In one modification, not shown, the top portion of the first front leg is disposed outside (on either side) of the first side member.

In one example of the second expression, the first lower arm 22 is a stroller basket support arm. In one modification, the seat-bottom member 74 has a front portion 76, and a front portion 48 of the first lower arm 22 is spaced apart below the front portion 76 of the seat-bottom member 74 allowing manual access therebetween. This allows front access to a stroller basket. In the same or another modification, the stroller assembly 10 also includes a stroller footrest 70 attached to the front portion 48 of the first lower arm 22.

In one construction of the second expression, the first lower arm 22 is disposed transversely inward of the first front leg 16. In the same or another construction, a bottom portion 44 of the first handle arm 20 is transversely disposed outward of the first lower arm 22. In other constructions, not shown, the first lower arm and the first front leg are otherwise transversely disposed, and the bottom portion of the first handle arm and the first lower arm are otherwise transversely disposed.

In the second expression, the attachment of the first rear leg is left to the artisan and is not limited to the attachment, including the use of a first hinge link, as previously described in the first expression.

Several benefits and advantages are derived from the invention. In the examples where the first lower arm is a stroller basket support arm, the stroller assemblies of the first and second expressions allow front access to the stroller basket. In the first expression and construction where the first lower arm is disposed transversely inward of the first rear leg and the first hinge link is disposed transversely between the first rear leg and the first lower arm, the first hinge link is not visible from the side of the unfolded stroller frame avoiding catching on the clothing or body of the stroller occupant and the stroller user.

The foregoing description of several expressions of a first embodiment of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A stroller assembly comprising:
   a) a stroller seat having a seat-bottom member; and
   b) a foldable stroller frame having an unfolded position and a folded frame position, wherein the foldable stroller frame in the unfolded frame position includes:
      (1) a first side member, wherein the seat-bottom member is attached to the first side member;
      (2) a first front leg pivotally attached to the first side member;
      (3) a first handle arm pivotally attached to the first side member at a first pivotal location; and
      (4) a first lower arm disposed below the scat-bottom member, wherein the first lower arm is pivotally attached to the first front leg, and wherein the first handle arm is pivotally attached to the first lower arm at a second pivotal location.

2. The stroller assembly of claim 1, wherein the first side member has a top portion, and wherein an area of the top portion of the first side member defines a stroller armrest.

3. The stroller assembly of claim 1, wherein a to portion of the first front leg is disposed within the first side member.

4. The stroller assembly of claim 3, wherein the first side member has a recess allowing pivotal motion of the first front leg between an unfolded front-leg position and a folded front-leg position.

5. The stroller assembly of claim 1, wherein the first lower arm is a stroller basket support arm.

6. The stroller assembly of claim 5, wherein the seat-bottom member has a front portion, and wherein a front portion of the first lower arm is spaced apart below the front portion of the seat-bottom member allowing manual access therebetween.

7. The stroller assembly of claim 6, also including a stroller footrest attached to the front portion of the first lower arm.

8. The stroller assembly of claim 1, wherein the first side member is substantially vertically disposed.

9. The stroller assembly of claim 1, wherein the first lower arm is disposed transversely inward of the first front leg.

10. The stroller assembly of claim 1, wherein a bottom portion of the first handle arm is transversely disposed outward of the first lower arm.

11. A stroller assembly comprising:
    a) a stroller seat having a seat-bottom member; and
    b) a foldable stroller frame having an unfolded frame position and a folded frame position, wherein the foldable stroller frame in the unfolded frame position includes:
       (1) a first side member having a front portion and a rear portion, wherein the seat-bottom member is immovably attached to the first side member;
       (2) a first front leg having a top portion pivotally attached to the front portion of the first side member and having a bottom portion;
       (3) a first rear leg having a top portion pivotally attached to the first side member intermediate the front and rear portions of the first side member and having a bottom portion;
       (4) a first handle arm having a top portion and a bottom portion and pivotally attached to the rear portion of the first side member intermediate the top and bottom portions of the first handle arm;

(5) a first lower arm having a front portion and a rear portion and disposed below the seat-bottom member, wherein the front portion of the first lower arm is pivotally attached to the first front leg intermediate the top and bottom portions of the first front leg, and wherein the bottom portion of the first handle arm is pivotally attached to the first lower arm intermediate the front and rear portions of the first lower arm; and (6) a first hinge link having a first end portion and a second end portion, wherein the first end portion of the first hinge link is pivotally attached to the first handle arm intermediate the bottom portion of the first handle arm and the pivotal attachment of the first handle arm to the rear portion of the first side member, and wherein the second end portion of the first hinge link is pivotally attached to the first rear leg intermediate the top and bottom portions of the first rear leg.

12. The stroller assembly of claim 11, wherein the first side member has a top portion, and wherein an area of the top portion of the first side member defines a stroller armrest.

13. The stroller assembly of claim 11, wherein the top portion of the first front leg is disposed within the first side member, and wherein the first side member has an opening allowing pivotal motion of the first front leg between an unfolded front-leg position and a folded front-leg position.

14. The stroller assembly of claim 11, wherein the top portion of the first rear leg is disposed within the first side member, and wherein the first side member has a recess allowing pivotal motion of the first rear leg between an unfolded rear-leg position and a folded rear-leg position.

15. The stroller assembly of claim 11, wherein the first lower arm is a stroller basket support arm.

16. The stroller assembly of claim 15, wherein the seat-bottom member has a front portion, and wherein the front portion of the first lower arm is spaced apart below the front portion of the seat-bottom member allowing manual access therebetween.

17. The stroller assembly of claim 16, also including a stroller footrest attached to the front portion of the first lower arm.

18. The stroller assembly of claim 11, wherein the first side member is substantially vertically disposed.

19. The stroller assembly of claim 11, wherein the first lower arm is disposed transversely inward of the first rear leg, and wherein the first hinge link is disposed transversely between the first rear leg and the first lower arm.

20. The stroller assembly of claim 11, wherein the bottom portion of the first handle arm is transversely disposed between the first rear leg and the first lower arm.

* * * * *

UNITED STATES PATENT AND TRADEMARK OFFICE
CERTIFICATE OF CORRECTION

PATENT NO.    : 6,464,244 B1
DATED         : October 15, 2002
INVENTOR(S)   : Larry Cheng It is certified that error appears in the above-identified patent and that said Letters Patent is hereby corrected as shown below:

Column 6,
Line 9, after the word "unfolded" insert -- frame --.
Line 18, change "scat-bottom" to seat-bottom --.
Line 25, change "to" to -- top --.

Signed and Sealed this

Twenty-fifth Day of February, 2003

JAMES E. ROGAN
*Director of the United States Patent and Trademark Office*